(12) United States Patent  (10) Patent No.: US 9,262,649 B2
Bertin et al.  (45) Date of Patent: Feb. 16, 2016

(54) SECURITY BETWEEN ELECTRONIC COMPONENTS OF A PORTABLE SECURED ELECTRONIC UNIT

(75) Inventors: Marc Bertin, La Celle les Bordes (FR); Joseph Hoppe, Les Molieres (FR)

(73) Assignee: OBERTHUR TECHNOLOGIES, Paris (FR)

( * ) Notice: Subject to any disclaimer, the term of this patent is extended or adjusted under 35 U.S.C. 154(b) by 1412 days.

(21) Appl. No.: 12/093,454

(22) PCT Filed: Nov. 7, 2006

(86) PCT No.: PCT/FR2006/002472
§ 371 (c)(1),
(2), (4) Date: May 13, 2008

(87) PCT Pub. No.: WO2007/057536
PCT Pub. Date: May 24, 2007

(65) Prior Publication Data
US 2008/0289003 A1  Nov. 20, 2008

(30) Foreign Application Priority Data
Nov. 15, 2005  (FR) ..................................... 05 11566

(51) Int. Cl.
*G06F 21/87* (2013.01)
*G06K 19/07* (2006.01)
(Continued)

(52) U.S. Cl.
CPC ............... *G06F 21/87* (2013.01); *G06K 19/07* (2013.01); *G06K 19/073* (2013.01); *G06K 19/0723* (2013.01); *G06K 19/07749* (2013.01); *H01L 2224/48091* (2013.01);
(Continued)

(58) Field of Classification Search
CPC .................................. G06F 21/87; G06F 21/77
USPC ................. 713/6, 12, 185; 726/2–4, 9, 34–35
See application file for complete search history.

(56) References Cited

U.S. PATENT DOCUMENTS 4,910,393 A * 3/1990 Gercekci et al. .............. 235/380
4,933,898 A * 6/1990 Gilberg ................... G06F 21/86
257/659

(Continued)

FOREIGN PATENT DOCUMENTS

EP       1 020 813 A2    7/2000
WO    2004/025545 A2    3/2004

OTHER PUBLICATIONS

Kuramitsu et al.; TTP: secure ACID transfer protocol for electronic ticket between personal tamper-proof devices; Published in: Computer Software and Applications Conference, 2000. COMPSAC 2000. The 24th Annual International; Date of Conference: 2000; pp. 87-92; Meeting Date: Oct. 25, 2000-Oct. 27, 2000; IEEE Xplore.*

(Continued)

*Primary Examiner* — Bradley Holder
(74) *Attorney, Agent, or Firm* — Young & Thompson

(57) ABSTRACT

A portable secured electronic unit includes at least two electronic components, one of which is embodied in the form of a primary electronic component and the second in the form of an interface electronic component, wherein the two electronic components are interconnected by communication elements and at least one electronic component includes security elements for securing the communication thereof the other electronic component.

9 Claims, 2 Drawing Sheets

(51) Int. Cl.
*G06K 19/073* (2006.01)
*G06K 19/077* (2006.01)

(52) U.S. Cl.
CPC ............ *H01L 2224/48227* (2013.01); *H01L 2924/01079* (2013.01); *H01L 2924/01087* (2013.01); *H01L 2924/3011* (2013.01)

(56) References Cited

U.S. PATENT DOCUMENTS

| | | | |
|---|---|---|---|
| 5,748,782 A * | 5/1998 | Ferreira et al. | 382/232 |
| 5,787,174 A | 7/1998 | Tuttle | |
| 5,861,662 A * | 1/1999 | Candelore | G06F 21/87 257/679 |
| 6,105,136 A * | 8/2000 | Cromer et al. | 726/34 |
| 6,249,872 B1 * | 6/2001 | Wildgrube et al. | 726/2 |
| 6,745,331 B1 * | 6/2004 | Silverbrook | 726/36 |
| 7,062,652 B2 * | 6/2006 | Hirota et al. | 713/172 |
| 7,065,656 B2 * | 6/2006 | Schwenck et al. | 713/194 |
| 7,278,025 B2 * | 10/2007 | Saito | G06K 19/07 713/185 |
| 7,461,249 B1 * | 12/2008 | Pearson | G06F 21/10 705/59 |
| 7,535,373 B2 * | 5/2009 | Dalzell | G08B 13/128 340/541 |
| 2001/0033012 A1 | 10/2001 | Kommerling et al. | |
| 2002/0116626 A1 * | 8/2002 | Wood | 713/200 |
| 2003/0024994 A1 * | 2/2003 | Ladyansky | G06K 19/0702 235/492 |
| 2003/0160102 A1 | 8/2003 | Yoshimoto et al. | |
| 2004/0123132 A1 * | 6/2004 | Montgomery et al. | 713/200 |
| 2005/0039040 A1 * | 2/2005 | Ransom et al. | 713/200 |
| 2005/0044403 A1 * | 2/2005 | Kim | 713/200 |
| 2007/0277044 A1 * | 11/2007 | Graf et al. | 713/185 |
| 2008/0209550 A1 * | 8/2008 | Di Iorio | 726/22 |

OTHER PUBLICATIONS

Renaudin et al.; High Security Smartcards; Published in: Proceeding Date '04 Proceedings of the conference on Design, automation and test in Europe—vol. 1 p. 10228; 2004; IEEE Computer Society; ACM Digital Library.*

* cited by examiner

SECURITY BETWEEN ELECTRONIC COMPONENTS OF A PORTABLE SECURED ELECTRONIC UNIT

The invention relates to a secure portable electronic unit, in particular a microcircuit card comprising at least two electronic components. A more particular object of the invention is to combat a type of fraud consisting in demounting an electronic component from a secure electronic entity to transplant it into another support or to replace it by another, fraudulent component.

The expansion of microcircuit cards in all fields constantly calls into question the security criteria. One of these criteria is the fact that any attempt to extract the module from the card must fail, i.e. by the card ceasing to work, for example.

Demounting the module from the body of a card, mounting it on another card body having on its faces fraudulent information identifying the holder, in particular a graphic personalization, is known.

Much research has been directed to increasing the security of chip cards. In particular, the document FR 2833801 describes a method of producing a microcircuit card comprising a support card and a module carrying the microcircuit. The module is installed in an open cavity of the support card. The module is fixed into the card support cavity with the aid of a resin at least partially filling the cavity and covering the microcircuit. Within the module, there is strong adhesion between a support film and the microcircuit of the module, the support film forming a printed circuit carrying the microcircuit on one of its faces. The module is fixed after adjusting the adhesion of the resin to the wall of the cavity so that it is significantly greater than its adhesion to the support film of the module.

In this way, if a fraudster attempts to demount the module, for example by inserting a tool between the edge of the cavity and that of the module, the force exerted at most results in separation of the film from the resin, the microcircuit and its connecting leads remaining embedded in the resin attached to the cavity.

The microcircuit can nevertheless be separated from the support of the card, however, and have associated with it a new contacts area comprising the contacts or the contacts area that was detached before inserting the same microcircuit into a new card body. It is also known from FR2788359 to have a chip card having an integrated screen to enable graphic and/or text personalization via the screen. A fraudster may be tempted to falsify the display by means of a fraudulent module. An attack can consist in replacing the existing screen by a fraudulent screen or controlling the screen with a fraudulent microcontroller so that the screen displays erroneous information.

In such cases, the screen and the microprocessor of the card are integrated into the same support, typically of molded plastic material to create a unitary support.

Electronic entities comprising intrusion detection means are known from the documents EP0408456 and EP0417447. These entities are able to react to an intrusion attempt by causing them to stop working, for example, or indicating that an intrusion has been detected.

However, these means in principle react to an attack and detect a physical change within the secure portable electronic entity.

An object of the invention is to detect and to react to this type of attack by modification of the structure of the card.

To this end the invention proposes a secure portable electronic entity comprising at least two electronic components including a primary electronic component and an interface electronic component, the two electronic components being connected by communication means, at least one of said two electronic components comprising security means adapted to secure its communication with the other of said two electronic components.

Clearly securing communication between two electronic devices is known in itself, in particular from the document US2004203962. Nevertheless, one aspect of the invention is providing such security within an electronic entity itself, between components fastened together.

According to one advantageous feature said at least one of said two electronic components comprises means for testing a security condition and means for triggering a countermeasure if the condition is not respected.

According to this feature, the electronic component is advantageously able to detect that the electronic entity has been manipulated fraudulently and thus to trigger a countermeasure, for example by deactivating the electronic entity.

According to one particularly advantageous feature, the interface electronic component is a man-machine interface. In particular, the interface electronic component is advantageously a bistable type screen.

According to another advantageous feature, the interface electronic component is a screen capable of displaying personalized information including at least a photograph of the bearer.

According to another advantageous feature, the primary electronic entity comprises security means adapted to command refreshing of the screen with personalization data.

According to another advantageous feature, the security means adapted to command refreshing are executed upon powering up the electronic entity.

In one embodiment the primary electronic component advantageously comprises security means adapted to measure a magnitude representative of the interface electronic component.

According to this advantageous feature, the security means are able to measure a magnitude that must not change during the life of the electronic entity. Any modification of this magnitude reflects fraudulent manipulation of the electronic entity.

According to an advantageous feature, each of the two electronic components comprises security means, the security means of one electronic component being adapted to communicate with the security means of the second electronic component.

According to an advantageous feature, the security means of the primary electronic component comprise authentication means for authenticating the interface electronic component, said authentication means being adapted to communicate with complementary authentication means in the security means of said interface electronic component.

According to this advantageous feature, the components of the electronic entity are advantageously authenticated so as to detect that components that have to communicate with each other have not been separated.

According to one particular advantageous feature, the security means of said electronic components comprise encryption and decryption means adapted to encrypt and decrypt data exchanged between said electronic components.

According to another advantageous feature, at least one of said two electronic components is flush with the surface of the electronic entity.

In a correlated way, the invention also proposes a method for personalizing a portable secure electronic entity comprising at least two electronic components connected to each other including a primary electronic component and an interface electronic component, characterized in that means for securing communication between the two components are installed in at least one of said two electronic components.

This method has the same advantages and advantageous features as the secure portable electronic entity briefly described hereinabove.

The invention also proposes a method for securing a secure portable electronic entity comprising at least two electronic components connected to each other including a primary electronic component and an interface electronic component, characterized in that communication between said two electronic components is secure.

This method has the same advantages and advantageous features as the secure portable electronic entity briefly described hereinabove.

The invention will be more clearly understood and other advantages thereof will become apparent in the light of the following description of embodiments of a secure portable electronic entity according to the invention, given by way of example only and with reference to the appended drawings, in which.

Figure 1:
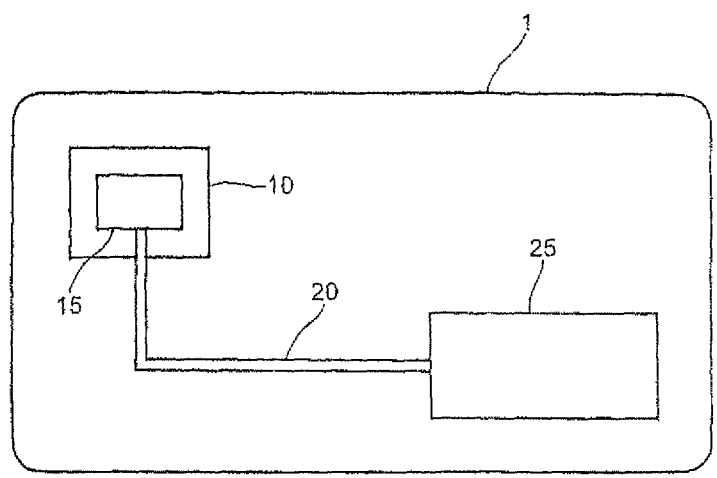
FIG. 1 shows one embodiment of a microcircuit card comprising display means according to the invention.

According to the invention, the secure portable electronic entity is a pocket electronic entity that can easily be transported by the bearer. One embodiment of the invention relates, for example, to a chip card defined by the ISO 7816 standard, i.e. formed of a plastic material card body 0.76 mm thick.

In another embodiment, it is a USB (Universal Serial Bus) key, for example, having dimensions less than 10 cm.

The electronic entity can also be an electronic passport including within the thickness of one of its sheets, for example the cover, a microcircuit and means for contactless communication with a station, for example according to the ISO 14443 standard.

The portable electronic entity is energized via a power supply interface conforming to the ISO 7816 standard, for example, i.e. based on contacts in a particular position that are connected in a card reader to receive power. Thus it does not include any power supply, such as a cell or battery, thereby reducing the dimension of the electronic entity.

There could be a cell or battery instead, of course.

According to the invention, the portable electronic entity comprises a primary electronic component and a secondary electronic component. In other embodiments it can comprise other, additional components.

The primary electronic component is in particular a secure controller.

That secure controller is in particular of the chip card module type supporting APDU type commands defined by the ISO 7816 standard.

The secondary electronic component is in particular an interface component and can communicate with the cardholder, in which case it is a man-machine interface, or communicate with an external device, in particular a card reader, in which case it is a machine-machine interface.

In the case of a man-machine interface, the secondary electronic component can be a fingerprint sensor, a screen or a keypad.

In the case of a machine-machine interface, the secondary electronic component is, for example, the contacts area comprising contacts flush with the surface of the card as defined by the ISO 7816 standard, or contacts conforming to the PCMCIA (Personal Computer Memory Card International Association) standard, or specific contacts for MMC (Multi Media Card) cards or a USB type interface. A machine-machine type interface can equally be of contactless type, and therefore take the form of an antenna, for example conforming to the ISO 14443 standard or of Bluetooth type.

A (primary or secondary) electronic component is an electronic device having input-output terminals for connecting it to another electronic device.

In one embodiment, the primary or secondary electronic components can be integrated circuits, printed circuits or a plurality of circuits, in particular a printed circuit plus integrated circuits.

The primary and secondary electronic components are linked by communication means, in particular a communication bus.

According to the invention, at least one of the two electronic components comprises security means for securing its communication with the other electronic component.

To guard against attacks, at least one of the two electronic components comprises means for testing a security condition and means for triggering a countermeasure if the condition is not respected.

Similarly, the primary electronic component can comprise means for authenticating the secondary electronic component so as to be sure that it is communicating with the electronic component that was associated with it at the time of fabrication of the portable electronic entity and not a fraudulent secondary electronic component.

Similarly, the secondary electronic component can be enabled to authenticate the primary electronic component.

To this end, they include encryption and/or decryption means able to encrypt and decrypt data exchanged between the electronic components.

In one embodiment, shown in FIG. 1, the electronic entity is a microcircuit card 1 as defined by the ISO 7816 standard comprising a module 10 and display means 25. This module 10 comprises on the one hand a microcircuit 15 and on the other hand a contacts area including the contacts of the card that enable the card to communicate with an external device. The contacts are connected to the terminals of the circuit of the module. The module 10 and the display means are connected in particular by a communication bus 20.

This module 20 constitutes the primary electronic component of the card while the display means 25 constitute the secondary electronic component.

Figure 2:
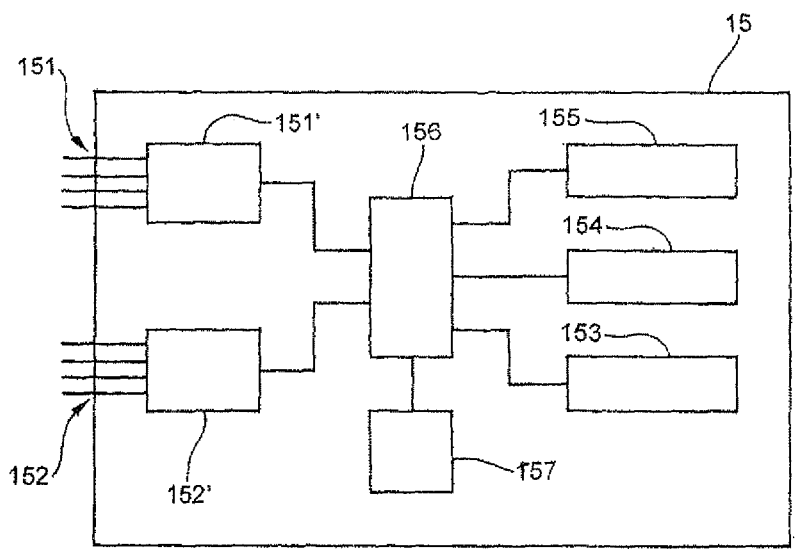
FIG. 2 is a diagrammatic representation of the microcircuit from FIG. 1.

As shown in FIG. 2, the microcircuit 15 is a secure microprocessor, for example, comprising in particular a processing unit 156, input-output means 151 connected to the contacts of the card via a UART (Universal Asynchronous Receiver Transmitter) 151', a communication interface with the screen 152 and a UART 152', and storage means, for example an EEPROM 153, a read only memory (ROM) 154 and a random access memory (RAM) 155.

The microcircuit can equally comprise a cryptoprocessor 157.

Figure 3:
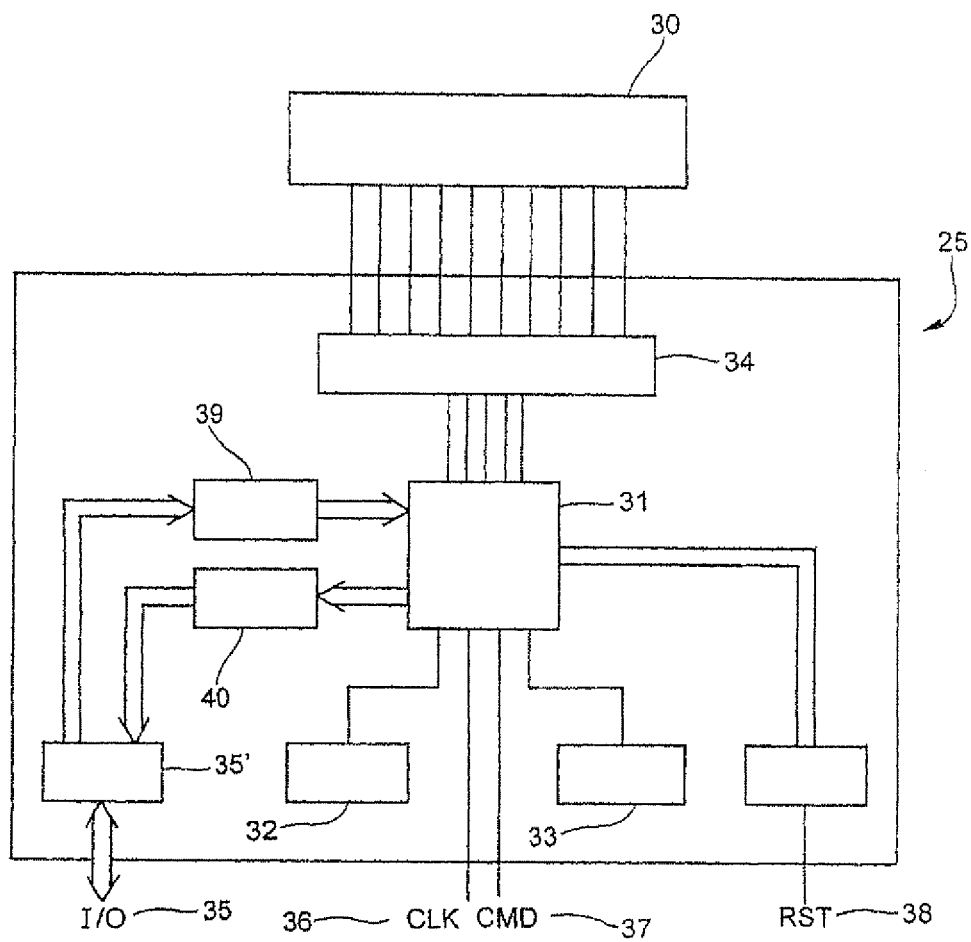
FIG. 3 is a diagrammatic representation of the display means from FIG. 1.

FIG. 3 shows the secondary electronic component, i.e. the display means in this application.

The display means 25, comprising a viewing screen 30, are controlled by a microprocessor 31 which has random access memory (RAM) 32 and read only memory (ROM) 33.

The microprocessor 31 and the screen 30 can communicate via a memory and/or multiplexer type controller 34, in particular if the microprocessor 31 outputs data to be displayed on the screen byte by byte.

The display means 25 comprise an input-output interface 35 adapted to send or receive data and where appropriate a control input-output 36. The signal received at the control input-output 36 determines if data received via the input-output interface 35 is control data to be executed by the microprocessor 31 or data to be displayed. Note that the input-output interface 35 comprises a UART 35'.

The display means 25 also comprise a random access memory 32 and an EEPROM or ROM 33.

The display means 25 can in particular consist of a printed circuit onto which are assembled integrated circuits including the aforementioned elements (31, 34, 35, 36, etc.).

In one embodiment, received data relating to a command and data to be displayed can be distinguished by using a specific communication protocol.

The display means 25 also receive a clock signal 37 adapted to time the microprocessor and have a power supply input 38.

The screen 30 can be a bistable screen, i.e. able to maintain a display produced when the display means are powered up in the absence of a power supply. This type of screen is particularly suitable for portable electronic entities having no power supply.

When the microcircuit card 1 is powered up, for example on inserting the card into a card reader, the bistable screen is refreshed by displaying personalization data. For example, the screen displays personalization data for the cardholder. Note that the screen must project from the reader so that the screen can be viewed.

It is more advantageous if the personalization information includes a photograph of the bearer, their name, the name and the logo of the issuing organization, and a card number, for example.

Refreshing of the screen can entail a step during which the screen is briefly black.

Accordingly, after insertion of the card into a card reader, the microcircuit 15 is powered up and effects a reset procedure, for example a reset to zero (Answer To Reset (ATR)) conforming to the ISO 7816 standard. This reset includes a step of sending a command to refresh the screen, in particular with personalization information on the cardholder. If this refreshing is not done, then a trader can deduce that the card has been manipulated fraudulently, for example by changing an electronic component of the card.

In an alternative that is not shown, the electronic entity includes a cell and a pushbutton and the screen is refreshed when the user presses the pushbutton.

The module 10 and the display means 25 comprise security means. For example, the module 10 comprises a hardware or software module for encrypting data that it sends to the display means 25 in order to display it and the display means 25 comprise a hardware or software module 39 for decrypting encrypted data received from the module 10. The decrypting module is on the upstream side of the UART in the display means 25, for example, but it can instead be downstream of the UART.

In one embodiment, the module 10 and the display means each comprise a module (40) for encrypting and decrypting data.

The encryption algorithm used is a symmetrical encryption algorithm such as the DES (Data Encryption Standard) algorithm or the AES (Advanced Encryption Standard) algorithm, for example. The algorithm can equally be an asymmetrical algorithm such as the RSA (so named after Rivest, Shamir and Adleman, the inventors of the algorithm).

The encryption/decryption keys for a batch of screens can be identical. In this case, they are stored in the hardware modules or in ROM.

These encryption/decryption keys can also vary. In this case, they are stored in EEPROM and PROM (Programmable Read Only Memory) in the display means 25.

The module 10 must also store the necessary encryption and decryption key. The encryption/decryption keys corresponding to the key stored in the display means are stored at the time of personalizing the electronic entity in the module 10.

If encryption and decryption are effected by software, the program is stored in ROM in the module 10 and the display means 25, for example.

The primary electronic component, i.e. the module 10 in this embodiment, can comprise means for authenticating the secondary electronic component. It can make sure that it is communicating with the secondary component integrated into the card during its fabrication and not with a fraudulent secondary component.

In this case, it must also comprise means for receiving an authentication command and means for sending authentication information on reception of such an enquiry.

For security reasons, the primary electronic component can request the secondary electronic component to authenticate itself at times of its choice.

In the case of challenge-response authentication, using a key, the secondary electronic component encrypts a random value that it has received that was generated by the primary electronic component. For its part, the primary electronic component encrypts this value and on reception of the encryption result by the secondary electronic component compares its result with the result received.

In one particular embodiment, means can be provided in the microcircuit 15 for measuring a magnitude representative of an electronic component, for example an impedance measurement. This measurement can consist in the value of the resistance of a circuit measured between two terminals of a microcircuit.

Figure 4:
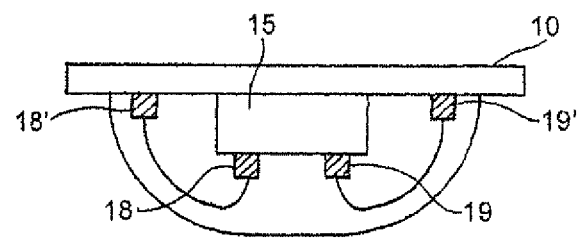
FIG. 4 is a representation of the impedance measuring means in a module of a microcircuit card.

FIG. 4 shows a physical structure of the module 10 connected to a contacts area. The impedance between the contacts 18 and 19 can be tested, for example.

In this case, the microcircuit 15 is considered as the primary electronic component and the contacts area as the secondary electronic component.

Contacts 18' and 19' on the inside surface of the contacts area are connected to the contacts 18 and 19 using standard wire bonding techniques, and a track connects the contacts 18' and 19'. It should be noted that the track (not shown) is on one face, the "inside" face of the contacts area, i.e. the face opposite that with the external contacts of the printed circuit.

At the time of personalizing the microcircuit card, and on receipt of a command, the impedance measuring means in the microcircuit 15 measure the impedance between the contacts 18 and 19 and store the result obtained in EEPROM 153.

Then, for example on each power-up, the impedance measuring means measure the impedance between the contacts 18 and 19 again and compare the result obtained with the stored value. If the difference exceeds a predetermined threshold, the microcircuit 15 triggers a countermeasure. This provides assurance that the connection between the microcircuit and the contacts area has not been cut or damaged.

In one embodiment, the impedance measuring means can be implemented in the display means 25.

This impedance measuring method can be used for any secondary electronic component provided that there is a connection between two dedicated contacts on the component.

In a complementary way, fabrication techniques strengthening the connection between the electronic components of a secure portable electronic entity as described in the document FR 2833801 can be used.

The primary electronic component includes countermeasure means that are triggered on detection of a security condition anomaly, resulting in particular from the connection between the primary electronic component and the secondary electronic component. That anomaly can be detected during authentication, during impedance measurement, and also during encryption/decryption, for example by detecting aberrant information after the decryption operation.

The countermeasure triggered can be to take the component out of service, for example by writing a specific value into a predetermined memory, deleting the content of the memory component, or sending a message reporting the anomaly to the communication interface.

In one embodiment, the secondary electronic component comprises means for triggering a countermeasure on detection of an anomaly in testing a security condition.

In another embodiment, the primary electronic component can be an interface component such as a screen and be adapted to authenticate another component, for example, such as a chip card type microcontroller or a fingerprint sensor.

The invention claimed is:

1. A secure portable electronic entity comprising:
   at least two electronic components including a primary electronic component and an electronic man-machine interface, the at least two electronic components being connected by a communication bus;
   at least one of said at least two electronic components comprising a secure processor that provides secure communication with another of said at least two electronic components through said communication bus and that is configured to encrypt and decrypt data exchanged between said at least two electronic components; and
   a cryptographic controller within said at least one of said at least two electronic components that authenticates the electronic man-machine interface, the cryptographic controller not including a shield or non-shield layer spreading over said at least two electronic components, wherein said cryptographic controller also detects whether the at least one of said at least two electronic components have not been separated fraudulently from the other of said at least two electronic components thereby ensuring that the at least one of said at least two electronic components is communicating with the other of said at least two electronic components,
   wherein said secure processor is configured to trigger a countermeasure if the electronic man-machine interface is not authenticated.

2. The electronic entity according to claim 1, wherein the electronic man-machine interface comprises a bistable screen.

3. The electronic entity according to claim 2, wherein the bistable screen is configured to display personalized information including at least a photograph of a bearer.

4. The electronic entity according to claim 2, wherein the primary electronic component comprises the secure processor that is configured to command refreshing of the bistable screen with personalization data.

5. The electronic entity according to claim 4, wherein the secure processor is configured to refresh the bistable screen upon powering up the secure portable electronic entity.

6. The electronic entity according to claim 1, wherein each of the at least two electronic components comprises a said secure processor that is configured to communicate with the secure processor of the other of said at least two electronic components.

7. The electronic entity according to claim 1, wherein the at least one of said at least two electronic components is flush with a surface of the electronic entity.

8. A method for securing a secure portable electronic entity comprising:
   at least two electronic components that are connected to each other by a communication bus and that include a primary electronic component and an electronic man-machine interface, at least one of said at least two electronic components providing secure communication via a secure processor with another of said at least two electronic components through the communication bus and encrypting and decrypting data exchanged between said at least two electronic components,
   the method further comprising, without using a shield or non-shield layer spreading over said at least two electronic components:
   the at least one of said at least two electronic components detecting whether the electronic entity has been manipulated fraudulently;
   the at least one of said two electronic components cryptographically authenticating the electronic man-machine interface to detect whether the at least two components have not been separated;
   communicating between said at least two electronic components securely upon detecting that the components have not been separated; and
   the at least one of said at least two electronic components triggering a countermeasure via the secure processor if the electronic man-machine interface is not authenticated.

9. A non-transient computer-readable medium comprising instructions for causing a computer to execute a method for securing a secure portable electronic entity comprising:
   at least two electronic components that are connected to each other by a communication bus and that include a primary electronic component and an electronic man-machine interface, at least one of said at least two electronic components providing secure communication via a secure processor with another of said at least two electronic components through the communication bus and encrypting and decrypting data exchanged between said at least two electronic components,
   the method further comprising, without using a shield or non-shield layer spreading over said at least two electronic components:
   the at least one of said at least two electronic components detecting whether the electronic entity has been manipulated fraudulently;
   the at least one of said two electronic components cryptographically authenticating the electronic man-machine interface to detect whether the at least two components have not been separated;
   communicating between said at least two electronic components securely upon detecting that the components have not been separated; and the at least one of said at least two electronic components triggering a countermeasure via the secure processor if the electronic man-machine interface is not authenticated.

* * * * *